United States Patent
Gao et al.

(10) Patent No.: US 10,111,196 B2
(45) Date of Patent: Oct. 23, 2018

(54) METHOD FOR TIME SYNCHRONIZATION BETWEEN WIRELESS DEVICES, WIRELESS DEVICE, AND WIRELESS COMMUNICATION SYSTEM

(71) Applicant: GOERTEK INC., Weifang, ShanDong Province (CN)

(72) Inventors: Qiang Gao, Weifang (CN); Binbin Jiang, Weifang (CN); Chongle Wang, Weifang (CN); Xiaobo Zeng, Weifang (CN)

(73) Assignee: Goertek Inc., Weifang, Shandong Province (CN)

( * ) Notice: Subject to any disclaimer, the term of this patent is extended or adjusted under 35 U.S.C. 154(b) by 113 days.

(21) Appl. No.: 15/324,134

(22) PCT Filed: Sep. 8, 2015

(86) PCT No.: PCT/CN2015/089140
§ 371 (c)(1),
(2) Date: Jan. 5, 2017

(87) PCT Pub. No.: WO2016/041452
PCT Pub. Date: Mar. 24, 2016

(65) Prior Publication Data
US 2017/0208558 A1   Jul. 20, 2017

(30) Foreign Application Priority Data
Sep. 15, 2014 (CN) .......................... 2014 1 0469644

(51) Int. Cl.
*H04J 3/06* (2006.01)
*H04W 56/00* (2009.01)
(Continued)

(52) U.S. Cl.
CPC ......... *H04W 56/002* (2013.01); *H04L 5/0055* (2013.01); *H04R 3/12* (2013.01);
(Continued)

(58) Field of Classification Search
CPC ... H04W 56/002; H04W 4/06; H04W 56/005; H04W 76/14; H04W 76/023; H04L 5/0053
(Continued)

(56) References Cited

U.S. PATENT DOCUMENTS

| 6,611,755 | B1* | 8/2003 | Coffee | ..................... | B28C 5/422 |
| | | | | | 340/438 |
| 2007/0081514 | A1* | 4/2007 | Shirokura | .............. | H04B 7/269 |
| | | | | | 370/350 |
| 2013/0044658 | A1* | 2/2013 | Zhu | ................... | H04W 52/0229 |
| | | | | | 370/311 |

FOREIGN PATENT DOCUMENTS

| CN | 1242119 | 1/2000 |
| CN | 102073056 | 5/2011 |

(Continued)

OTHER PUBLICATIONS

International Search Report from the State Intellectual Property Office of the P.R. China for International Application No. PCT/CN2015/089140, dated Nov. 20, 2015.

*Primary Examiner* — Chi H Pham
*Assistant Examiner* — Alexander O Boakye
(74) *Attorney, Agent, or Firm* — Finnegan, Henderson, Farabow, Garrett & Dunner LLP

(57) ABSTRACT

A method for time synchronization between wireless devices comprises: obtaining a time difference corresponding to a single synchronization operation between a first wireless device and a second wireless device; performing validity filtering to the time difference corresponding to the single synchronization operation, and extracting valid time differ- (Continued)

ence data; performing smoothing processing on valid time difference data corresponding to multiple times of the single synchronization operation within a preset time period, and obtaining an average time difference of the second wireless device relative to the first wireless device within the preset time period; adjusting system time of the second wireless device based on the obtained average time difference at an interval of the preset time period, so as to make the second wireless device time-synchronized with the first wireless device.

15 Claims, 5 Drawing Sheets

(51) Int. Cl.
    *H04L 5/00*     (2006.01)
    *H04W 4/06*     (2009.01)
    *H04R 3/12*     (2006.01)
    *H04W 76/02*     (2009.01)
    *H04W 84/12*     (2009.01)
    *H04W 76/14*     (2018.01)

(52) U.S. Cl.
    CPC ........... *H04W 4/06* (2013.01); *H04W 56/005* (2013.01); *H04R 2420/07* (2013.01); *H04W 76/023* (2013.01); *H04W 76/14* (2018.02); *H04W 84/12* (2013.01)

(58) Field of Classification Search
    USPC ........................................................ 370/350
    See application file for complete search history.

(56) References Cited

FOREIGN PATENT DOCUMENTS

| | | |
|---|---|---|
| CN | 103138863 | 6/2013 |
| CN | 104244399 | 12/2014 |
| EP | 1 801 786 | 6/2007 |

\* cited by examiner

METHOD FOR TIME SYNCHRONIZATION BETWEEN WIRELESS DEVICES, WIRELESS DEVICE, AND WIRELESS COMMUNICATION SYSTEM

TECHNICAL FIELD

The present disclosure relates to the field of wireless communication technologies, and more specifically relates to a method for time synchronization between wireless devices, a wireless device, and a wireless communication system.

BACKGROUND

As people become increasingly demanding on the sound quality of wireless loudspeaker boxes, they are dissatisfied with lossy audio data in Bluetooth transmission. This boosts emergence of WiFi-based lossless audio transmission systems.

In some WiFi or WiFi-Direct connected audio systems, if each loudspeaker box only plays one sound channel, synchronous playing between loudspeaker boxes appears very important. For example, in a music playing system having two loudspeaker boxes, loudspeaker box 1 is set to play a left channel of a piece of stereo music while loudspeaker box 2 is set to play a right channel of the same piece of stereo music. If a time difference of playing between the two loudspeaker boxes is greater than 5 ms, human ears can clearly sense the playing unsynchronization, which greatly dampens the experience of music enjoyment.

Existing solutions adopt two implementation approaches: hardware and software. Although hardware implementation may achieve a relatively precise time synchronization, it costs dearly; while although software implementation has a lower cost, its time synchronization has a poor precision.

SUMMARY

In view of the above, the present disclosure provides a method for time synchronization between wireless devices, a wireless device, and a wireless communication system, so as to achieve highly precise time synchronization between wireless devices in a software approach independent of hardware.

In order to achieve the object above, a technical solution of the present disclosure is implemented as such:

According to one aspect of the present disclosure, there is provided a method of time synchronization between wireless devices, the method comprising:

Based on time of transceiving corresponding data packets by a first wireless device and time of transceiving corresponding data packets by a second wireless device, obtained during a single synchronization operation between the first wireless device and the second wireless device, computing a time difference corresponding to the single synchronization operation of the second wireless device relative to the first wireless device;

performing validity filtering to the time difference corresponding to the single synchronization operation, and extracting valid time difference data;

performing smoothing processing to valid time difference data corresponding to multiple times of the single synchronization operation within a preset time period, and obtaining an average time difference of the second wireless device relative to the first wireless device within the preset time period;

adjusting system time of the second wireless device based on the average time difference obtained at an interval of the preset time period, so as to make the second wireless device time-synchronized with the first wireless device.

According to another aspect of the present disclosure, there is provided a wireless device, comprising:

a single synchronization computing unit configured to, based on time of transceiving corresponding data packets by a first wireless device and time of transceiving corresponding data packets by the wireless device, as obtained during a single synchronization operation between the first wireless device and the wireless device, computing a time difference corresponding to the single synchronization operation of itself relative to the first wireless device;

a filtering unit configured to perform validity filtering to the time difference corresponding to the single synchronization operation, and extract valid time difference data;

a smoothing unit configured to perform smoothing processing to valid time difference data corresponding to multiple times of the single synchronization operation within a preset time period, and obtain an average time difference of the wireless device relative to the first wireless device;

a time adjusting, unit configured to adjust system time of the wireless device based on the obtained average time difference at an interval of preset time, so as to make the wireless device time-synchronized with the first wireless device.

According to a further aspect of the present disclosure, there is provided a wireless communication system, the system comprising: a first wireless device for providing an audio source, one or more second wireless devices as a wireless loudspeaker box, wherein the first wireless device and the second wireless are connected via WIFI or WiFi-direct; the second wireless device is a wireless device above.

According to a still further aspect of the present disclosure, there is provided a computer program that comprises computer-readable codes which, when being executed on a computing device, cause the computing device to perform the method above.

According to a further aspect of the present disclosure, there is provided a computer readable medium that stores the computer program above.

The present disclosure has the following technical effects:

By performing validity filtering to the obtained time difference data during the single synchronization operation so as to remove poor data, by performing smoothing processing to time difference data for multiple times of the single synchronization operation after validity filtering within a preset time period, without a need of additional hardware, the time synchronization method between wireless devices, wireless device, and wireless communication system according to the disclosure of the present disclosure can obtain an average time difference within the preset time period with a higher precision, so as to adjust the system time of a to-be-synchronized wireless device at an interval of a preset time period based on the obtained average time difference data; in this way, the system time difference between wireless devices may be made to less than thereby achieving a high-precision time synchronization between wireless devices.

Further, by making data packets interacting in broadcast or multicast, the time synchronization method between wireless devices, wireless device, and wireless communication system according to the disclosure of the present disclosure can avoid error in the average transmission time caused by retransmitting data packets during the single synchronization operation, so as to be capable of removing invalid time difference data based on an average transmission time, which guarantees the time difference precision of a single synchronization operation.

BRIEF DESCRIPTION OF THE DRAWINGS

The accompanying drawings, which provide further understanding of the present disclosure and constitute part of the specification, are used, together with the embodiments of the present disclosure, for explaining the present disclosure, rather than limiting the present disclosure. In the accompanying drawings.

DETAILED DESCRIPTION

In order to make the objectives, technical solutions and advantages of the present disclosure more apparent, the embodiments of the present disclosure will be described in further detail with reference to the accompanying drawings.

In the description below, a first wireless device acts as a primary device for time synchronization. The primary device may be a Server that provides a time source for time synchronization. A second wireless device acts as a secondary device for time synchronization. The secondary device may be a Client, which needs to obtain a time difference between its local system time and a Server system time so as to adjust the local system time or adjust the local system time counter to keep synchronized with the Server system time. In a wireless communication system, the Server is connected with one or more Clients via WIFI or WIFI-Direct.

Figure 1:
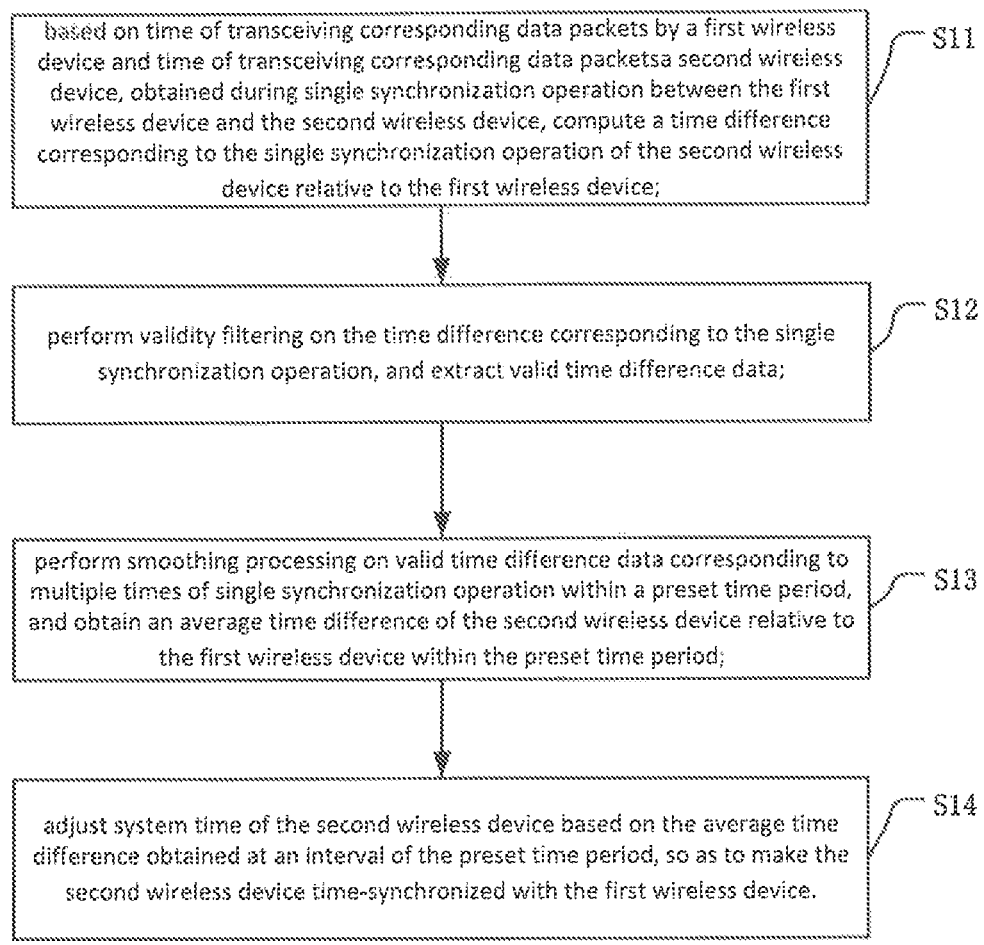
FIG. 1 illustrates a flow diagram of a method for time synchronization between wireless devices in an embodiment of the present disclosure.

FIG. 1 illustrates a flow diagram of a method for time synchronization between wireless devices in an embodiment of the present disclosure. As illustrated in FIG. 1 the method comprises:

Step S11: Based on time of transceiving corresponding data packets by a first wireless device and time of transceiving corresponding data packets by a second wireless device, obtained during the single synchronization operation between the first wireless device and the second wireless device, compute a time difference corresponding to the single synchronization operation of the second wireless device relative to the first wireless device.

Figure 2:
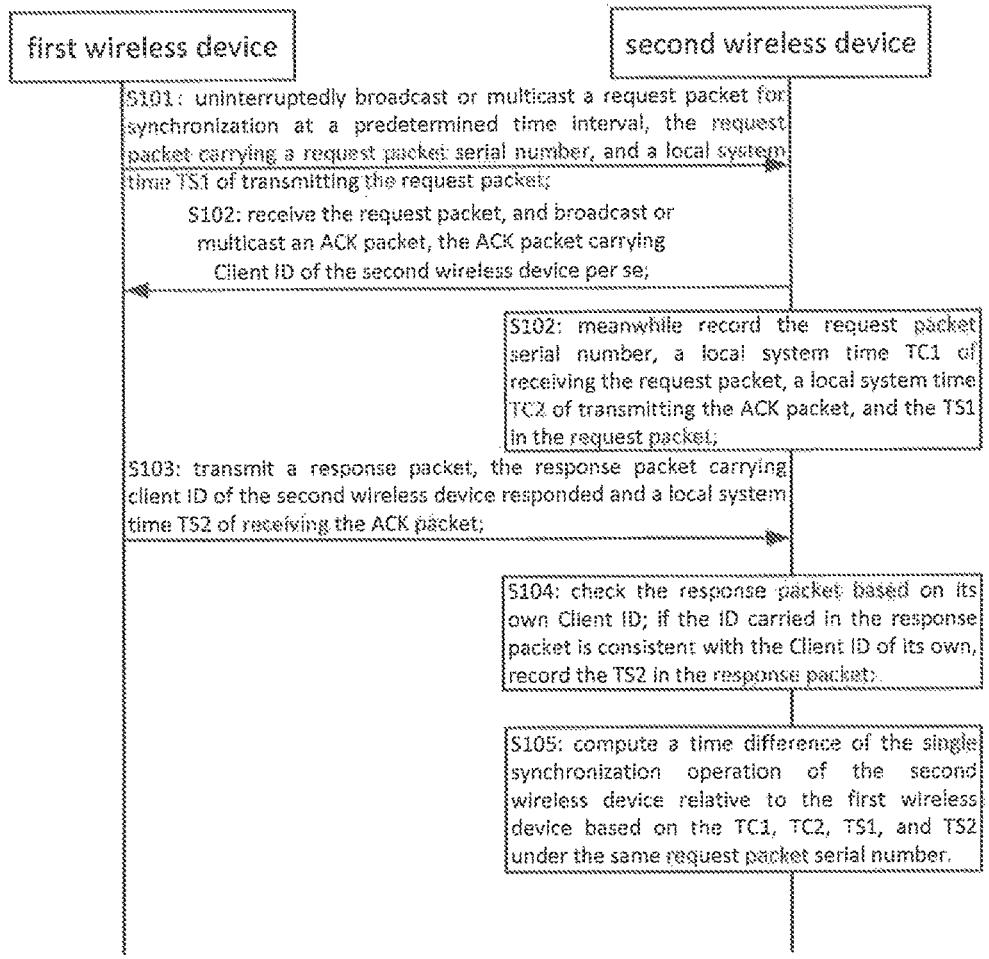
FIG. 2 illustrates a flow diagram of obtaining a time difference of a second wireless device corresponding to a single synchronization operation relative to a first wireless device in an embodiment of the present disclosure.

In one embodiment of the present disclosure, as illustrated in FIG. 2, step S11 of obtaining a time difference corresponding to the single synchronization operation of the second wireless device relative to the first wireless device specifically comprises:

Step S101: the first wireless device uninterruptedly broadcasts or multicasts a request packet for synchronization at a predetermined time interval, the request packet carrying a request packet serial number, and a local system time TS1 of transmitting the request packet.

The first wireless device Server uninterruptedly broadcasts or multicasts the request packet for synchronization, and the request packet must include a data packet serial number (so as to avoid the impact of packet loss), and the current system time TS1.

Step S102: the second wireless device receives the request packet and broadcasts or multicasts an acknowledgement (ACK) packet, the acknowledgement packet carrying Client ID of the second wireless device per se, and meanwhile the second wireless device records the request packet serial number, a local system time TC1 of receiving the request packet, a local system time TC2 of transmitting the acknowledgement packet, and the current system time TS1 in the request packet.

The second wireless device Client receives the data packet broadcast by the Server at the local system time TC1, saves the TS1 and the TC1, and then transmits the ACK packet to the Server by broadcast or multicast, the ACK packet should include Client ID for distinguishing different Clients, and meanwhile the Client should save the local time TC2 of transmitting the ACK packet.

In step S103, the first wireless device transmits a response packet after receiving the ACK packet, the response packet carrying ID of the second wireless device responded and a local system time TS2 of receiving the response packet.

The first wireless device Server receives the ACK packet and saves the system time TS2 of receiving the ACK packet; and then transmits the TS2 and the Client ID in the ACK packet to the Client end. Here, there is no limitation regarding the specific transmission manner as employed, which may employ a broadcast or multicast manner, or a non-broadcast non-multicast manner.

In step S104, the second wireless device checks the response packet based on its own Client ID; if the ID carried in the response packet is consistent with the Client ID of its own, the TS2 in the response packet is recorded.

After receiving the response data packet transmitted by the Server, the second wireless device Client checks whether the Client ID is correct; if true, save TS2; otherwise, discard the response data packet.

Steps S101-S104 form a single synchronization operation; in case of any data loss or abnormality during the procedure, this synchronization operation ends and will be re-executed from S101 to start a next synchronization operation.

Figure 3:
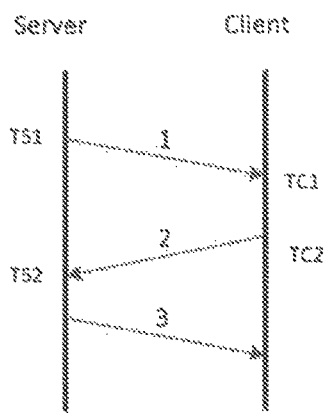
FIG. 3 illustrates a schematic diagram of a data packet interaction procedure during a single synchronization operation according to the present disclosure.

Based on the above illustration, the schematic diagram of data packet interaction process in the above-mentioned single synchronization operation is illustrated in FIG. 3. It is seen that the single synchronization operation between the first wireless device and the second wireless device in the present embodiment comprises: 1) receiving, by the second wireless device, a request packet for synchronization transmitted by the first wireless device; 2) transmitting, by the second wireless device, an ACK packet to the first wireless device based on the request packet; 3) receiving, by the second wireless device, a response packet returned by the first wireless device based on the ACK packet.

Figure 4:
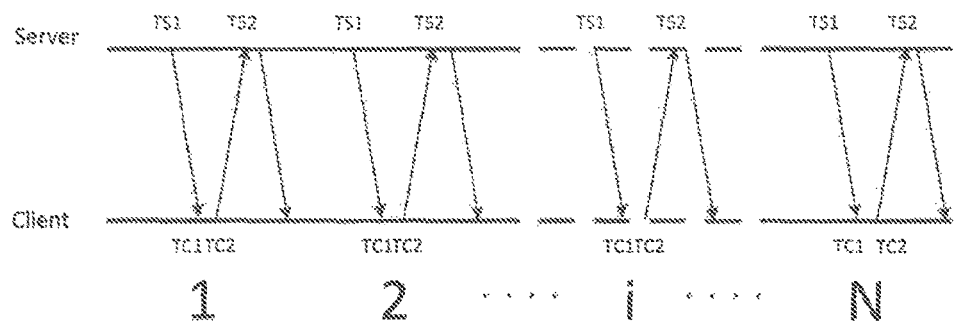
FIG. 4 illustrates a schematic diagram of a data packet interaction procedure in multiple times of the single synchronization operation according to the present disclosure.

Steps S101-S104 above are periodically repeated. The data packet interaction procedure in multiple times of the single synchronization operation is illustrated in FIG. 4. In the scenario as illustrated in FIG. 4, N times of the single synchronization operation are included within a preset period of time.

In step S105, the second wireless device computes a time difference of the single synchronization operation of the second wireless device relative to the first wireless device based on the TC1, TC2, TS1, and TS2 under the same request packet serial number.

Specifically, the second wireless device bases on the following time transmission equations:

$$TC1 = TS1 + Tdiff + Ttrans1 \quad (1)$$

$$TS2 + Tdiff = TC2 + Ttrans2 \quad (2)$$

wherein Tdiff denotes a time difference of a single synchronization operation, Ttrans1 denotes transmission time of the request packet under the single synchronization operation, while Ttrans2 denotes transmission time of the ACK packet under the single synchronization operation.

It is reasonably assumed that the communication paths are symmetrical, i.e., Ttrans1=Ttrans2, thereby obtaining average transmission time Ttrans of the single synchronization operation and a time difference Tdiff of the single synchronization operation:

$$Ttrans = (TC1 + TS2 - TS1 - TC2)/2;$$

$$Tdiff = (TC1 - TS2 - TS1 + TC2)/2.$$

It should be noted that two factors affect Tdiff precision: the first factor is that the time of transmission from the Server to the Client is different from the time of transmission from the Client to the Server, while transmission using WiFi or WiFi-Direct will exacerbate the adverse impact of this factor. The second factor is that for a scenario without employing broadcast and multicast, if the data packet is lost, retransmission will be generally incurred, while the time information in a retransmit packet, e.g., TS1 in the data packet from the Server to the Client in step S11, is not updated, which will worsen the impact caused by the first factor. Therefore, the data packets in above steps S11 and S12 according to the present disclosure use broadcast or multicast to interact so as to avoid transmission time error caused by retransmitting data in one synchronization operation.

Step S12: perform validity filtering on the time difference corresponding to the single synchronization operation, and extract valid time difference data.

In order to alleviate the above impact on Tdiff precision, certain algorithm is needed to filter adverse data so as to enhance the precision of the obtained time difference.

Scenario 1 of performing validity filtering on the time difference of the single synchronization operation:

when determining occurrence of data packet loss or abnormality during a certain single synchronization operation, filter off the time difference data of the single synchronization operation, wherein the determining occurrence of data packet loss or abnormality during a certain synchronization operation comprises:

checking, by the second wireless device, the response packet based on its own client ID; if the ID carried in the response packet is inconsistent with the client ID of its own, determining occurrence of data packet abnormality during the single synchronization operation; or, when the second wireless device judges that no request packet or ACK packet under a corresponding, request packet serial number has been received within an allowed time range, determining occurrence of data packet loss during the single synchronization operation.

Scenario 2 of performing validity filtering on the time difference of the single synchronization operation:

selecting a threshold for average transmission time for data packets between the first wireless device and the second wireless device; if the average transmission time of a certain single synchronization operation exceeds the threshold, filtering off the time difference data of the single synchronization operation.

This is because: in the case of data packet loss or abnormality during a single synchronization operation, a valid time difference of the single synchronization operation will not be obtained, such that the data obtained from this synchronization operation should be excluded; in addition, due to existence of time differences between primary and secondary devices, true Ttrans1 and Ttrans2 cannot be obtained, such that the time difference Tdiff for the single synchronization operation cannot be computed; however, the average transmission time Ttrans of the single synchronization operations may be computed; if the average transmission time Ttrans is too large, it is generally caused by a too large one-way transmission time; therefore, the time difference data Tdiff of the single synchronization operation may be filtered based on the average transmission time corresponding to the single synchronization operation.

Step S13: perform smoothing processing to valid time difference data corresponding to multiple times of the single synchronization operation within a preset time period, and obtain an average time difference of the second wireless device relative to the first wireless device within the preset time period.

The filtered data may be subjected to time difference computation between the primary and secondary devices in the next step; however, due to the impact of uncertainty of the wireless network transmission time, it is needed to perform smoothing processing to the time difference Tdiff of multiple times of the single synchronization operation within a predetermined period of time. Because different devices have different computational capabilities, different algorithms may be employed to process.

One implementation of smoothing processing: least square approach.

Smoothing processing is performed by least square curve fitting based on the synchronization time of each single synchronization operation and the time difference data corresponding to the single synchronization operation.

Specifically, a least square equation $Y = a + b*X$ is employed, wherein Y denotes a time difference of the single synchronization operation, and X denotes synchronization time corresponding to the single synchronization operation.

Values of a and h are obtained through the following equation based on a value pair including the validity-filtered time difference Yi of multiple times of the single synchronization operation within a preset period of time and a corresponding time point Xi, wherein m denotes a number of value pairs:

$$b = \left[\sum XiYi - \frac{\sum Xi \sum Yi}{m}\right] / \left[\sum Xi^2 - \frac{(\sum Xi)^2}{m}\right]$$

$$a = \frac{\sum Yi}{m} - b * \frac{\sum Xi}{m}$$

wherein the b denotes a slope describing a time variation trend, and the a denotes an average time difference of the second wireless device relative to the first wireless device within a set time period. Xi denotes synchronization time of the ith synchronization operation, Yi denotes a time difference between the primary end and the secondary end of the ith synchronization operation, i.e., the time difference of the second wireless device relative to the first wireless device in the ith synchronization operation.

Another implementation method of smoothing processing: mean value approach.

A mean value is calculated for valid time difference data corresponding to multiple times of the single synchronization operation within a preset time period. Specifically, the mean value is calculated for validity-filtered time differences of multiple times of the single synchronization operation within a preset time period. The mean value is just an average time difference of the second wireless device relative to the first wireless device within the preset period of time.

Step S14, adjust system time of the second wireless device based on the average time difference obtained at an interval of a preset time period, so as to make the second wireless device time synchronized with the first wireless device.

Customary means employed by those skilled in the art may be employed to adjust the local system time or adjust a counter of the local system time based on the obtained average time difference, adopting an adjtimex system command of the Linux system. The specific method is not for limiting the Protection scope of the present disclosure.

Hereinafter, the solution of the present disclosure will be further described with specific preferred embodiments.

The first wireless device Server side broadcasts or multicasts a synchronization request data packet uninterruptedly at a predetermined time interval of 100 ms to perform a synchronization operation. Table 1 below shows data derived from 10 times of the single synchronization operation:

TABLE 1

| Synchronization time (ms) | 100 | 200 | 300 | 400 | 500 | 600 | 700 | 800 | 900 | 1000 |
|---|---|---|---|---|---|---|---|---|---|---|
| Single Tdiff (μs) | 321 | 400 | x | 254 | 301 | 689 | 102 | 325 | 200 | 234 |
| Average transmission time (μs) | 706 | 709 | x | 701 | 754 | 1588 | 698 | 689 | 702 | 705 |

Wherein, the single synchronization operation corresponding to 300 ms fails, x denotes data loss at this time, which will not be considered in computation. The average transmission time corresponding to 600 ms is 1588 μs. The time is too large. The average transmission time exceeds a predetermined threshold; therefore, it is not considered in computation.

The selecting principle of the time interval 100 ms considers the occupancy rate of the network bandwidth on one hand; if a too short interval is selected, the occupancy rate of the bandwidth will be too high; on the other hand, selection of a too large interval will cause the synchronization speed between the Client and the Server too slow.

The time period as set in the embodiment is a time interval (100 ms)*10 times=1 s, i.e., adjusting the local system time of the Client once at an interval of is based on the obtained time difference. The selecting principle of the preset time period needs to consider the computational capability of the device and the synchronization speed between the Client and the Server.

After performing validity filtering to the computed data of the 10 times of the single synchronization operation, table 2 below illustrates data after validity filtering:

TABLE 2

| | Synchronization time (ms) | | | | | | | |
|---|---|---|---|---|---|---|---|---|
| | 100 | 200 | 400 | 500 | 700 | 800 | 900 | 1000 |
| Single Tdiff (μs) | 321 | 400 | 254 | 301 | 102 | 325 | 200 | 234 |

Smoothing Processing Manner 1: Least square Approach

Figure 5:
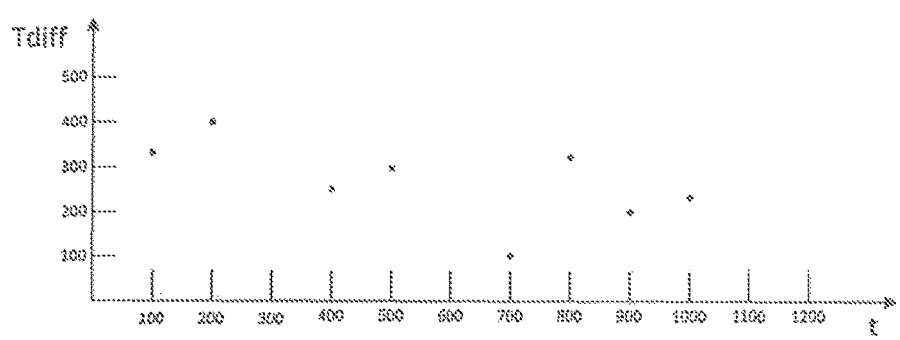
FIG. 5 illustrates a schematic diagram of mapping value pairs in a rectangular coordinate system according to one preferred embodiment of the present disclosure.
Figure 6:
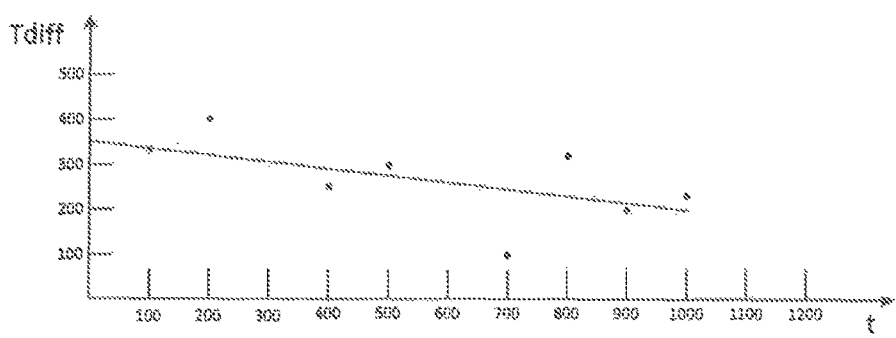
FIG. 6 illustrates a schematic diagram of also mapping a least square method value line obtained according to the value pairs in FIG. 5 in the rectangular coordinate system.

With the horizontal coordinate as the synchronization time (ms) and the vertical coordinate as the computed time difference between the primary and secondary ends during the single synchronization operation, a rectangular coordinate system is established and the value pairs in table 2 are drawn in the rectangular coordinate system, as shown in FIG. 5.

The equation Tdiff=a+b*t is used, wherein a, b are any real numbers. Usually, Y is used to substitute for Tdiff, X to substitute for t; then, the equation above is Y=a+bX, thereby deriving a slope for describing the time variation trend and an average value of Tdiff that needs to be adjusted.

Values a and b may be derived using the following equations, where m denotes the number of value pairs. In the present embodiment, m=8:

$$b = \left[\sum XiYi - \frac{\sum Xi \sum Yi}{m}\right] / \left[\sum Xi^2 - \frac{(\sum Xi)^2}{m}\right]$$

$$a = \frac{\sum Yi}{m} - b * \frac{\sum Xi}{m}$$

substitute with the value pairs in Table 2 to compute, deriving a=357.9; b=0.1578. Therefore, the data line of Y=a+bX is also drawn in the rectangular coordinate system, as shown in FIG. 5.

b in the equation above is just sa slope, which can reflect whether the system clock at the Client side is faster or slower than that at the Server side, such that the system clock counter at the Client side may be adjusted according to data b, so as to make the pace of the system clock at the Client side consistent with that at the Server side.

a in the equation above may indicate the system time difference of the Client side relative to the Server side when t=1000 ms. In accordance with the equation Tdiff=a+b*t and the computed values of a and b, it may be computed that at t=1000 ms time, the system time difference of the Client side relative to the Server side is Tdiffnow=200.1; then, the system clock counter at the Client side may be adjusted based on the time difference data so as to adjust the system time or directly modify the system time at the Client side.

Hereinafter, how to adjust the system clock using slope will be illustrated through an example.

Adjust clock tempo: different software and hardware systems have different implementations. Hereinafter, a common Linux system is taken as an example.

The system clock may be adjusted using a system command adjtimex (clock adjustment command):

In the adjtimex command, −t parameter represents a count value (usually 10000) of each system tick (usually 10 ms, which is a relative value, a time length the system believes); the time length of each count value is t'; the absolute time length corresponding to t' in an ideal state is fixed and cannot be changed.

Generally, that the count value being 10000 corresponds to the real time length of each system tick (10 ms) being 10000*t'. Modifying this count value can change the real time length of each system tick (10 ms), thereby achieving the object of adjusting the system clock tempo.

"adjtimex-t 10001"; adjust the system clock one ten-thousandth slower

"adjtimex-t 9999"; adjust the system clock one ten-thousandth faster

In the above example, the slope b=0.1578, the unit of Y is µs (10−6 s), the unit of X is ms (10−3 s); every 1 ms passes, the primary-secondary time difference will change −0.1578 µs. In other words, the time at the Client side is 1.578/10000 times faster than that at the Server side; if the adjtimex may support a floating number, the adjustment command will be "adjtimex-t 10001.578." However, if the adjtimex does not support the floating number, in order to achieve the object, "adjtimex-t 10002" and "adjtimex-t 10000" may be used in alternation to achieve the object of adjustment. For example, first execute "adjtimex-t 10002," then execute "adjtimex-t 10000" 7.89 seconds later, and then end the "adjtimex-t 10000" command 2.11 seconds later; in this way, this adjustment of primary-slavery time difference is completed within 10 seconds. Before obtaining a new next group of data, the two adjtimex commands above are executed alternately with a cycle of 10 s; when a next group of data is obtained, a similar method is adopted again to obtain a slope based on the next group of data so as to adjust the primary-secondary time difference using the adjtimex command.

Smoothing Processing Manner II: Mean Value Approach

Still with the value pairs in Table 2 as an example, 8 valid data are collected within 1000 ms; a mean value is calculated for the 8 valid Tdiff data, deriving a mean value of 267.125 µs. This mean value indicates the average time difference between the primary and secondary sides within the current predetermined period of time, i.e., the time at the Client side is 267.125 µs earlier than that at the Server side. Based on this time difference data, the time difference between the primary end and the secondary sides may be adjusted to 0 within a preset time period of 1 s. For example, the system time of the Client will be adjusted slower by 2.67.125 µs.

Also with the Linux system as an example, the adjtimex system command is used. The calculation equation for adjtimex-t parameter is provided as follows:

$$1000000*X/10000=(1000000+267.125)$$

$$X=10002.67125$$

Because X cannot be set as a floating number, X may be a value greater than 10002.67125, e.g., X=10012; then, the time for adjusting 267.125 µs with this parameter is (1000000+267.125)*10000/10012=999068.2 µs.

Therefore, the command "adjtimex-t 10012" is used; and about 0.999 seconds later, "adjtimex-t 10000" is used to resume the original count value, thereby completing the adjustment of the time difference between the primary and secondary sides within 1 s. When a next group of data is obtained, a new average time difference will be derived; with the same manner, the time difference between the primary and secondary sides is adjusted using the adjtimex command.

Figure 7:
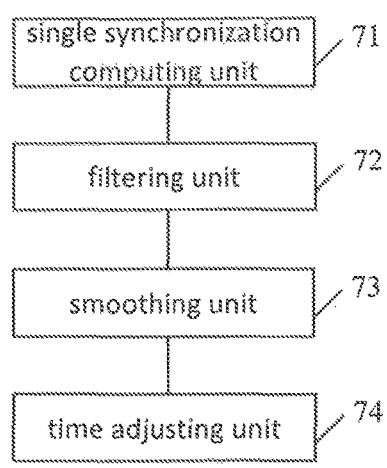
FIG. 7 illustrates a structural diagram of a wireless device in an embodiment of the present disclosure.

The present disclosure further discloses a wireless device for performing the method according to the present disclosure. The wireless device corresponds to the second wireless device Client in the above method. FIG. 7 illustrates a structural diagram of a wireless device in an embodiment of the present disclosure. As illustrated in FIG. 7, the wireless device comprises:

a single synchronization computing unit 71 configured to, based on time of transceiving corresponding data packets by a first wireless device and time of transceiving corresponding data packets by itself, obtained during a single synchronization operation between the first wireless device and the wireless device, computing a time difference corresponding to the single synchronization operation of the wireless device relative to the first wireless device;

a filtering unit 72 configured to perform validity filtering to the time difference corresponding to the single synchronization operation, and extract valid time difference data;

a smoothing unit 73 configured to perform smoothing processing to valid time difference data corresponding to multiple times of the single synchronization operation within a preset time period, and obtain an average time difference of the wireless device relative to the first wireless device within the preset time period;

a time adjusting unit 74 configured to adjust system time of the wireless device lied on the average time difference obtained at an interval of a preset time period, so as to make the wireless device time synchronized with the first wireless device.

Figure 8:
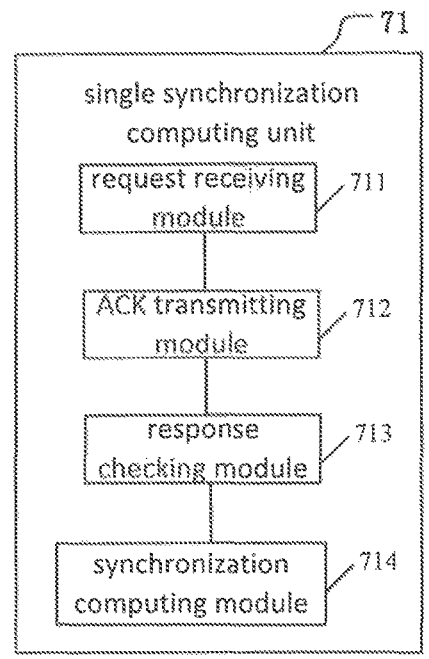
FIG. 8 illustrates a schematic diagram of compositions of a single synchronization computing unit in an embodiment of the present disclosure.

In one embodiment of the present disclosure, as illustrated in FIG. 8, the single synchronization computing unit 71 comprises:

a request receiving module 711 configured to receive a request packet for synchronization which is broadcast or multicast by the first wireless device at a predetermined time interval, the request packet carrying a request packet serial number, and a local system time TS1 of transmitting the request packet;

an ACK transmitting module 712 configured to broadcast or multicast an acknowledgement (ACK) packet to the first wireless device, the acknowledgement packet carrying client ID of the wireless device, and meanwhile record the request packet serial number, a local system time TC1 of receiving the request packet, a local system time TC2 of transmitting the acknowledgement packet, and the TS1;

a response check module 713 configured to check the response package transmitted by the first wireless device based on client ID of the wireless device, the response package carrying the client ID of the second wireless device responded and the local system time TS2 when the first wireless device receives the ACK packet; and if the ID carried in the response package is consistent with the client ID of the wireless device to which it belongs (e.g., a second wireless device), record the TS2;

a synchronization computing module 714 configured to compute a time difference corresponding to the single synchronization operation of the wireless device relative to the first wireless device based on the TC1, the TC2, the TS1 and the TS2 under the same request packet serial number.

Alternately, according to the following equations and based on the TC1, TC2, TS1 and TS2, the synchronization computing module 714 computes the time difference corresponding to the single synchronization operation of the first wireless device relative to the wireless device to which the synchronization computing module 714 belongs and average transmission time for the data packets between the first wireless device and the wireless device to which the synchronization computing module 714 belongs (e.g., the second wireless device) under the single synchronization operation:

$$Ttrans=(TC1+TS2-TS1-TC2)/2$$

$$Tdiff=(TC1-TS2-TS1+TC2)/2$$

wherein Tdiff denotes a time difference of the single synchronization operation, and Trans denotes average transmission time of the single synchronization operation.

In one embodiment of the present disclosure, the filtering unit 72 is specifically configured to filter off the time difference data of the single synchronization operation when determining an occurrence of data packet loss or abnormality during a certain single synchronization operation; specifically, the filtering unit 72 checks the response package based on client ID of the wireless device; if the ID carried in the response package is inconsistent with client ID of the wireless device, determine that data packet abnormality occurs during the single synchronization operation; and when it is judged that no request packet or ACK packet under a corresponding request packet serial number is received within a preset dine range, determine that data packet loss occurs during the single synchronization operation.

In one embodiment of the present disclosure, the filtering unit 72 is specifically configured to select a threshold for average transmission time of the data packet between the first wireless device and the wireless device; and if the average transmission time of a certain single synchronization operation exceeds the threshold, to filter off the time difference data of the single synchronization operation.

In another embodiment of the present disclosure, the smoothing unit 73 is specifically configured to perform smoothing processing by least square curve fitting based on the synchronization time of each single synchronization operation and the time difference data corresponding to the single synchronization operation; or to calculate a mean value for valid time difference data corresponding, to multiple times of the single synchronization operation within a set time period.

Figure 9:
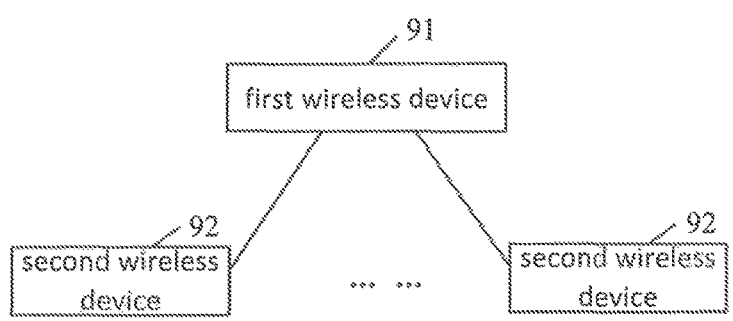
FIG. 9 illustrates a schematic diagram of compositions of a wireless communication system in an embodiment of the present disclosure.

FIG. 9 illustrates a schematic diagram of compositions of a wireless communication system in an embodiment of the present disclosure. As illustrated in FIG. 9, the system comprises: a first wireless device 91 for providing an audio source, one or more second wireless devices 92 as wireless loudspeaker box(s), wherein the first wireless device 91 and the second wireless device 92 are connected via WIFI or WIFI-direct; the second wireless device is the wireless device as shown in FIG. 7.

The system embodiment of the present disclosure has the same disclosure concept as the method embodiment of the present disclosure. The first wireless device, and one or more second wireless devices comprised in the system may correspond to implementation steps of the method embodiment of the present disclosure, which will not be detailed here.

In view of the above, by performing validity filtering on the obtained time difference data of the single synchronization operation so as to remove poor data, and by performing smoothing processing on validity-filtered time difference data of multiple times of the single synchronization operation within a preset time period, without need of additional hardware, the time synchronization method between wireless devices, wireless device, and wireless communication system according to the disclosure of the present disclosure can obtain an average time difference within the preset time period with a higher precision, so as to adjust the system time of a to-be-synchronized wireless device at an interval of a preset time period based on the obtained average time difference data; in this way, the system time difference between wireless devices may be made to less than 1 ms, thereby achieving a high-precision time synchronization between wireless devices.

Further, by making data packets interact in broadcast or multicast, the time synchronization method between wireless devices, wireless device, and wireless communication system according to the disclosure of the present disclosure can avoid an error in the average transmission time caused by retransmitting data packets during a single synchronization operation, so as to be capable of removing invalid time difference data based on average transmission time, which guarantees the time difference precision of the single synchronization operation.

It should be noted that:

The algorithm and display provided here is not inherently associated with any specific computer, virtual system or other device. Various general-purpose systems may also be used in conjunction with the teaching here. According to the description above, it is obvious to construct a structure required by this kind of system. Besides, the present disclosure is not directed to any specific programming language. It should be understood that the content of the present disclosure as described here may be implemented using various kinds of programming languages, and the description above with respect to a specific language is for disclosing the best modes of embodiments of the present disclosure.

The description provided here illustrates many specific details. However, it can be understood that the embodiments of the present disclosure may be practiced without these specific details. In some embodiments, well-known methods, structures and technologies are not shown in detail so as not to blur the understanding of the present description.

Similarly, it should be understood that in order to simplify the present disclosure and facilitate understanding of one or more of various aspects of the present disclosure, in the above description of the exemplary embodiments of the present disclosure, various features of the present disclosure are sometimes grouped together into a single embodiment, figure or description for it. However, the method of the present disclosure should not be interpreted to reflect the following intention: the present disclosure as claimed claims more features than what are explicitly stated in each claim. More exactly, as reflected by the appended claims, the aspects of the disclosure are less than all features of a single embodiment disclosed above. Therefore, the claims in conformity with a specific embodiment are explicitly incorporated into the specific embodiment, wherein each claim per se acts as an individual embodiment of the present disclosure.

Those skilled in the art may understand, the modules in a device in an embodiment may be adaptively changed and disposed into one or more devices different from the embodiment. Modules or units or components in an embodiment may be combined into one module or unit or component; besides, they may also be divided into a plurality of sub-modules or sub-units or sub-components. Except at least some of such features and/or processes or units are mutually exclusive, any combination may be employed to combine all features disclosed in the present description (including the appended claims, abstract and drawings) and combine all procedures or units of any such disclosed method or apparatus. Unless otherwise explicitly stated, each feature disclosed in the present description (including the appended claims, abstract and drawings) may be replaced by alternative features provide the same, equivalent or similar purposes.

Besides, those skilled in the art can understand that although some embodiments as described here include some features, but not other features, included in other embodiments, combination of features in different embodiments means falling within the scope of the present disclosure and forming a different embodiment. For example, in the appended claims, any one of the embodiments as claimed may be used in any combination manner.

Various component embodiments of the present disclosure may be implemented with hardware, or implemented with software modules running on one or more processors, or implemented by their combination. Those skilled in the art should understand that in practice, a microprocessor or digital signal processor (DSP) may be used to implement some or all functions of some or all components in the method according to the embodiments of the present disclosure. The present disclosure may also be implemented as a device or apparatus program (e.g., the computer program and computer program product) for executing a part or all of the method described here. Such program for implementing the present disclosure may be stored on a computer readable medium or may have a form of one or more signals. Such signal(s) may be downloaded from an Internet website, or provided on a carrier signal, or provided in any other form.

Figure 10:
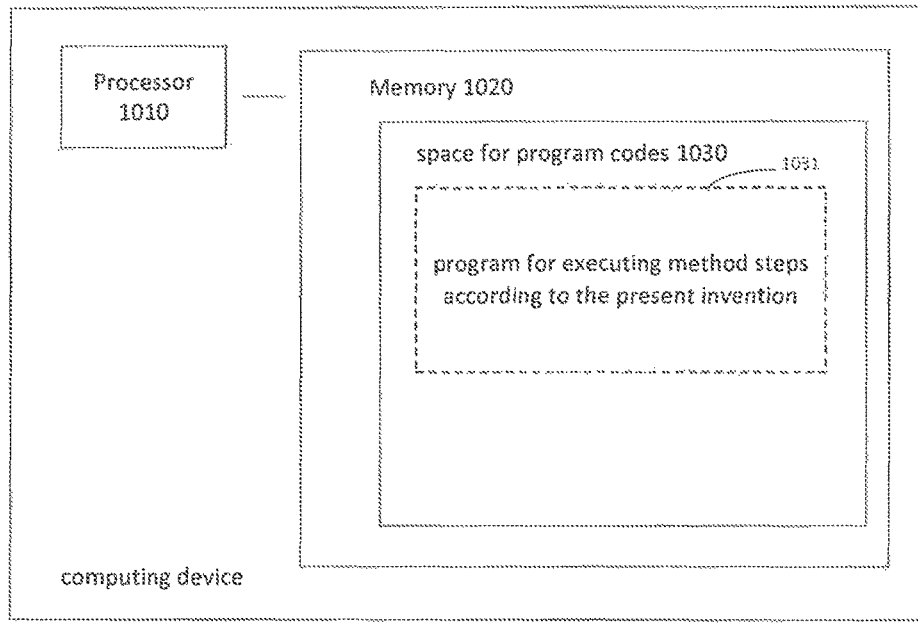
FIG. 10 illustrates a block diagram of a computing device for performing the method of the present disclosure.
Figure 11:
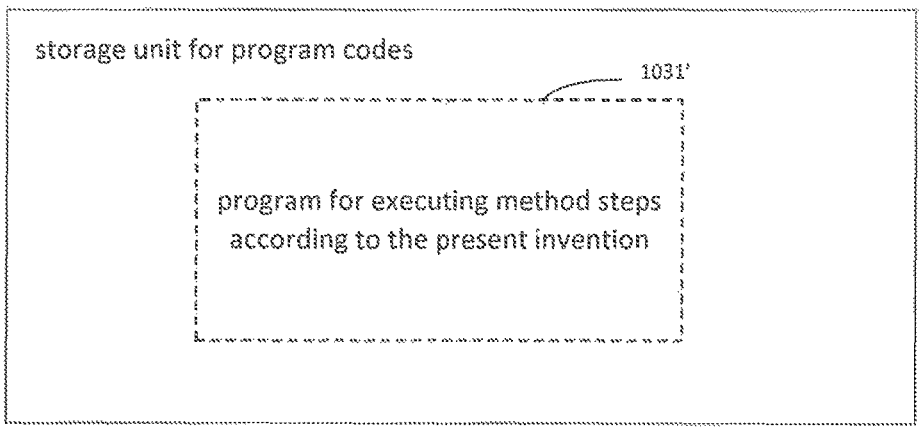
FIG. 11 illustrates a storing unit for holding or carrying program codes that implement the method of the present disclosure.

For example, FIG. 10 illustrates a computing device that may implement the method according to the present disclosure. With reference to FIG. 10, the computing device traditionally comprises a processor 1010 and a computer program product or computer readable medium in a form of a memory 1020. The memory 1020 may be an electronic memory such as a flash disk, an EEPROM (Electrically Erasable Programmable Read-Only Memory), EPROM, hard disk or ROM and the like. The memory 1020 has a storage space 1030 for program codes that execute any method step in the method above. For example, the storage space 1030 for program codes may include various program codes 1031 for implementing various steps in the method above, respectively. These program codes may be read out from one or more computer program products or written into the one or more computer program products. These computer program products include a program code carrier such as a hard disk, a compact disk (CD), a memory card or a floppy disk. Such computer program products is generally a portable or fixed memory unit with reference to FIG. 11. The memory unit may have a storage segment, a storage space arranged like the memory 1020 in the computing device of FIG. 10. The program code may be compressed in an appropriate form, as an example. Generally, the memory unit comprises computer-readable codes 1031', i.e., codes that may be read by a processor such as 1010. When executed by a computing device, these codes cause the computing device to execute various steps in the method described above.

The description provided herein illustrate many specific details. However, it can be understood that embodiments of the present disclosure may be practiced without these specific details, in some instances, known methods, structures and technologies are not detailed here so as not to blur the understanding of the present description.

It should be noted that the above embodiments are intended to illustrate, rather than limiting, the present disclosure. Moreover, without departing from the scope of the appended claims, alternative embodiments may be designed. In the claims, any reference numerals included within parentheses should not constitute a limitation to the claims. The word "comprise" does not exclude elements or steps not listed in the claims. The word "a" or "one" before an element does no exclude existence of a plurality of such elements. The present disclosure may be implemented by hardware including a plurality of different elements and by an appropriately programmed computer. In the unit claims specifying several modules, some of these modules may be specifically embodied through the same hardware item. Use of words such as first and second does not indicate any sequence; instead, these words may be interpreted as names.

What are mentioned above are only preferred embodiments of the present disclosure, not intended to limit the protection scope of the present disclosure. Any modifications, equivalent substitutions and improvements within the spirit and principle of the present disclosure should be included within the protection scope of the present disclosure.

The invention claimed is:

1. A method of time synchronization between wireless devices, the method comprising:
    based on time of transceiving corresponding data packets by a first wireless device and time of transceiving corresponding data packets by a second wireless device, obtained during a single synchronization operation between the first wireless device and the second wireless device, computing a time difference corresponding to the single synchronization operation of the second wireless device relative to the first wireless device;
    performing validity filtering to the time difference corresponding to the single synchronization operation, and extracting valid time difference data;
    performing smoothing processing on valid time difference data corresponding to multiple times of the single synchronization operation within a preset time period, and obtaining an average time difference of the second wireless device relative to the first wireless device within the preset time period; and
    adjusting system time of the second wireless device based on the average time difference obtained at an interval of the preset time period, so as to make the second wireless device time-synchronized with the first wireless device.

2. The method according to claim 1, characterized in that the based on time of transceiving corresponding data packets by a first wireless device and time of transceiving corresponding data packets by a second wireless device, obtained during the single synchronization operation between the first wireless device and the second wireless device, computing a time difference corresponding to the single synchronization operation of the second wireless device relative to the first wireless device comprises:
    broadcasting or multicasting, by the first wireless device, a request packet for synchronization at a predetermined time interval, the request packet carrying a request packet serial number, and a local system time TS1 of transmitting the request packet;

receiving, by the second wireless device, the request packet, and broadcasting or multicasting an acknowledgement packet, the acknowledgement packet carrying client ID of the second wireless device per se, and meanwhile recording the request packet serial number, a local system time TC1 of receiving the request packet, a local system time TC2 of transmitting the acknowledgement packet, and the system time TS1 in the request packet;

transmitting, by the first wireless device, a response packet after receiving the acknowledgement packet, the response packet carrying client ID of the second wireless device responded and a local system time TS2 of receiving the acknowledgement packet;

checking, by the second wireless device, the response packet based on its own client ID; if the client ID carried in the response packet is consistent with the client ID of its own, recording the TS2 in the response packet;

computing, by the second wireless device, a time difference of the single synchronization operation of the second wireless device relative to the first wireless device based on the TC1, TC2, TS1, and TS2 under the same request packet serial number.

3. The method according to claim 2, characterized in that the computing a time difference of the single synchronization operation of the second wireless device relative to the first wireless device based on the TC1, TC2, TS1, and TS2 under the same request packet serial number comprises:

according to the following equations and based on the TC1, TC2, TS1 and TS2, computing the time difference of the single synchronization operation of the first wireless device relative to the second wireless device and average transmission time for the data packets between the first wireless device and the second wireless device under the single synchronization operation:

$$Ttrans=(TC1+TS2-TS1-TC2)/2$$

$$Tdiff=(TC1-TS2-TS1+TC2)/2$$

wherein Tdiff denotes a time difference of the single synchronization operation, and Ttrans denotes average transmission time of the single synchronization operation.

4. The method according to claim 3, characterized in that the performing validity filtering to the time difference corresponding to the single synchronization operation comprises:

when determining occurrence of data packet loss or abnormality during a certain single synchronization operation, filtering off the time difference data of this single synchronization operation.

5. The method according to claim 4, characterized in that the determining occurrence of data packet loss or abnormality during a certain single synchronization operation comprises:

checking, by the second wireless device, the response packet based on its own client ID; if the client ID carried in the response packet is inconsistent with the client ID of its own, determining occurrence of data packet abnormality during the single synchronization operation; or, when judging, by the second wireless device, that a request packet or acknowledgement packet under a corresponding request packet serial number has not been received within an allowed time range, determining occurrence of data packet loss during the single synchronization operation.

6. The method according to claim 3, characterized in that the performing validity filtering to the time difference corresponding to the single synchronization operation comprises:

selecting a threshold for average transmission time for the data packets between the first wireless device and the second wireless device;

if the average transmission time of a certain single synchronization operation exceeds the threshold, filtering off the time difference data of this single synchronization operation.

7. The method according to claim 3, characterized in that the performing smoothing processing on valid time difference data corresponding to multiple times of the single synchronization operation within a preset time period comprises:

performing smoothing processing by least square curve fitting based on the synchronization time of each single synchronization operation and the time difference data corresponding to this single synchronization operation; or calculating a mean value of valid time difference data corresponding to multiple times of the single synchronization operation within the preset time period.

8. The method according to claim 3, characterized in that the adjusting system time of the second wireless device based on the obtained average time difference comprises:

adjusting a system clock of the second wireless device or a counter of the system clock based on the obtained average time difference using a clock adjusting command adjtimex of a Linux operating system.

9. A wireless device, comprising:

a single synchronization computing unit configured to, based on time of transceiving corresponding data packets by a first wireless device and time of transceiving corresponding data packets by the wireless device, obtained during a single synchronization operation between the first wireless device and the wireless device, computing a time difference corresponding to the single synchronization operation of the wireless device relative to the first wireless device;

a filtering unit configured to perform validity filtering to the time difference corresponding to the single synchronization operation, and extract valid time difference data;

a smoothing unit configured to perform smoothing processing on valid time difference data corresponding to multiple times of the single synchronization operation within a preset time period, and obtain an average time difference of the wireless device relative to the first wireless device within the preset time period; and a time adjusting unit configured to adjust system time of the wireless device based on the obtained average time difference at an interval of the preset time period, so as to make the wireless device time synchronized with the first wireless device.

10. The wireless device according to claim 9, characterized in that the single synchronization computing unit comprises:

a request-receiving module configured to receive a request packet for synchronization which is broadcast or multicast by the first wireless device at a predetermined time interval, the request packet carrying a request packet serial number, and a local system time TS1 of transmitting the request packet;

an acknowledgement transmitting module configured to broadcast or multicast an acknowledgement packet to the first wireless device, the acknowledgement packet carrying client ID of the wireless device, and meanwhile record the request packet serial number, a local system time TC1 of receiving the request packet, a local system time TC2 of transmitting the acknowledgement packet, and the TS1;

a response check module configured to check a response package transmitted by the first wireless device based on client ID of the wireless device to which the response check module belongs, the response package carrying client ID of a wireless device and a local system time TS2 of receiving the acknowledgement packet by the first wireless device; and if the client ID carried in the response package is consistent with the client ID of the wireless device to which the response check module belongs, record the TS2;

a synchronization computing module configured to compute the time difference of the single synchronization operation of the wireless device to which the synchronization computing module belongs relative to the first wireless device based on the TC1, TC2, TS1 and TS2 under the same request packet serial number, wherein the synchronization computing module is specifically configured to, according to the following equations and based on the TC1, TC2, TS1 and TS2, compute the time difference of the single synchronization operation of the first wireless device relative to the wireless device to which the synchronization computing module belongs and average transmission time for the data packets between the first wireless device and the wireless device to which the synchronization computing module belongs under the single synchronization operation:

$$Ttrans = (TC1 + TS2 - TS1 - TC2)/2$$

$$Tdiff = (TC1 - TS2 - TS1 + TC2)/2$$

wherein Tdiff denotes a time difference of the single synchronization operation, and Ttrans denotes average transmission time of the single synchronization operation.

11. The wireless device according to claim 10, characterized in that the filtering unit is specifically configured to, when determining an occurrence of data packet loss or abnormality during a certain single synchronization operation, filter off the time difference data of the single synchronization operation.

12. The wireless device according to claim 11, characterized in that, the filtering unit is specifically configured to check the response package based on client ID of the wireless device to which the filtering unit belongs to; if the client ID carried in the response package is inconsistent with the client ID of the wireless device, determine that data packet abnormality occurs during the single synchronization operation; and when it is judged that no request packet or acknowledgement packet under a corresponding request packet serial number is received within a preset time range, determine that data packet loss occurs during the single synchronization operation.

13. The wireless device according to claim 9, characterized in that, the filtering unit is specifically configured to select a threshold for average transmission time for the data packets between the first wireless device and the wireless device to which the filtering unit belongs; and if the average transmission time of a certain single synchronization operation exceeds the threshold, to filter off the time difference data of this single synchronization operation.

14. The wireless device according to claim 9, characterized in that, the smoothing unit is specifically configured to perform smoothing processing by least square curve fitting based on the synchronization time of each single synchronization operation and the time difference data corresponding to this single synchronization operation; or to calculate a mean value of valid time difference data corresponding to multiple times of the single synchronization operation within the preset time period.

15. A wireless communication system, comprises:

a first wireless device for providing an audio source, one or more second wireless devices as (a) wireless loudspeaker box(es), wherein the first wireless device and the second wireless device(s) are connected via WIFI or WIFI-direct; the second wireless device(s) is(are) a wireless device according to claim 9.

* * * * *